United States Patent [19]
Probasco

[11] 3,722,665
[45] Mar. 27, 1973

[54] VACUUM ELEVATING CONVEYOR

[75] Inventor: Charles W. Probasco, Lancaster, Ohio

[73] Assignee: Anchor Hocking Corporation, Lancaster, Ohio

[22] Filed: Mar. 31, 1971

[21] Appl. No.: 129,784

[52] U.S. Cl..................................................198/184
[51] Int. Cl...............................................B65g 15/00
[58] Field of Search..198/184; 271/74; 302/2 R, 2 A, 302/31

[56] References Cited

UNITED STATES PATENTS

| | | | |
|---|---|---|---|
| 3,650,369 | 3/1972 | Vergobbi | 302/2 R |
| 3,355,166 | 11/1967 | Plumb | 271/74 X |
| 3,321,121 | 5/1967 | Nyberg et al. | 271/74 X |

*Primary Examiner*—Evon C. Blunk
*Assistant Examiner*—Douglas D. Watts
*Attorney*—Norman N. Holland

[57] ABSTRACT

A conveyor is disclosed for moving articles such as closure caps and other articles in a continuous stream to a higher elevation along a relatively steep path. The conveyor has an endless belt with an air permeable surface. An inclined article transporting run of the belt passes over and communicates with a vacuum box whereby articles fed onto the bottom of the moving belt are held on the belt by a vacuum force as they are carried upwardly to the elevated discharge point. A control is included in the vacuum forming box to automatically regulate the vacuum force on the articles in accordance with the number of articles held on the moving belt.

1 Claim, 6 Drawing Figures

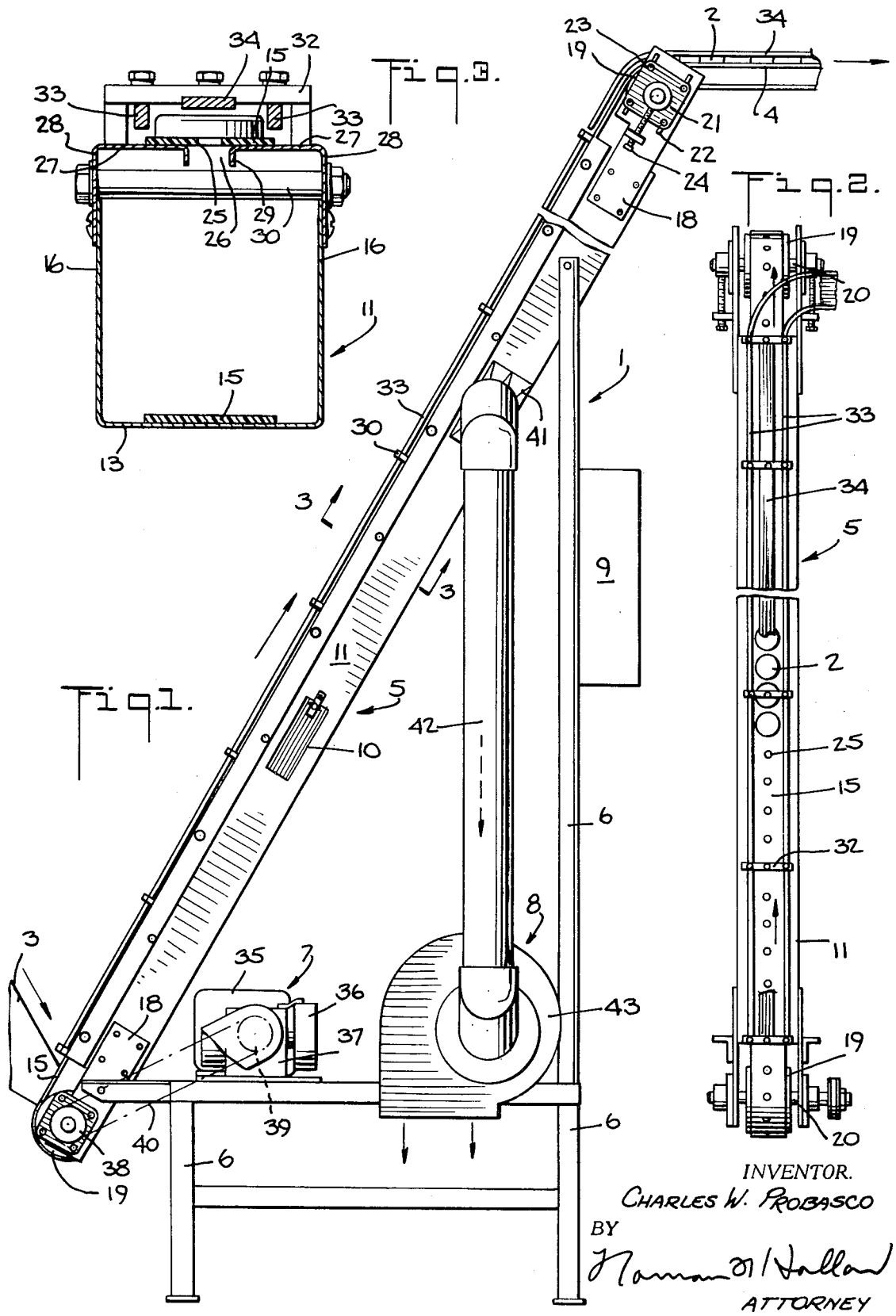

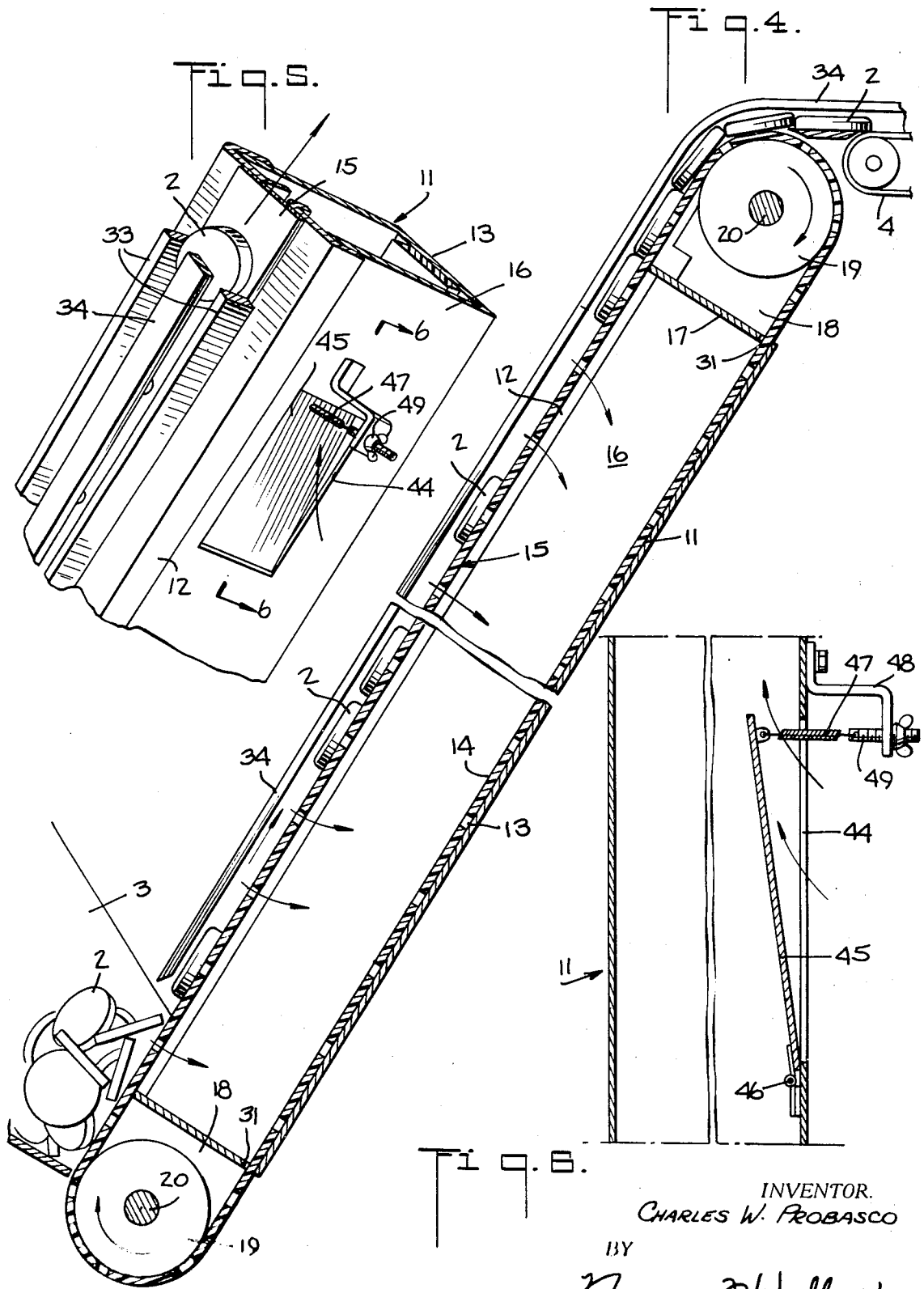

VACUUM ELEVATING CONVEYOR

BACKGROUND OF THE INVENTION

The present invention relates to a conveyor for elevating relatively small articles, such as closure caps and the like in a continuous stream to a raised elevation along a relatively steep path. More particularly, the invention relates to a device utilizing a controlled vacuum force for holding articles onto a moving conveyor belt surface as the articles are moved to their elevated position.

There are a variety of processing and manufacturing operations where it is necessary to feed or to supply a continuous stream of discrete articles to a particular station in the manufacturing or processing operation. Frequently, the desired delivery point is at an elevated position from the normal supply point for the articles. In addition, limited space requirements in such typical operations often require the means for supplying the articles to the raised point to act in a minimum space thereby requiring a conveyor or lifting means to move the articles up a relatively steep path.

Such an operation is very often required in packaging or container sealing operations of the type where a metal or plastic closure cap is used to seal a glass or other container and where a continuous high speed supply of the caps must be made to an elevated position in the sealing machine line. In this case and in numerous similar operations, an article supplying means is needed which is relatively simple and correspondingly reliable and which at the same time can move the articles along a relatively steep path at high speeds and without scratching or otherwise marking decorated or highly glossed surfaces of caps or other articles. Known conveyor devices which use mechanical cleats or other members for physically supporting and moving the caps are not suitable in these cases due to their tendency to scratch or otherwise mark the articles in high speed continuous feeding operations.

Accordingly, an object of the present invention is to provide an improved conveyor for lifting articles along a relatively steep path in a continuous stream.

Another object of the present invention is to provide a simple and reliable article conveyor operating on a relatively steep path.

Another object of the present invention is to provide an improved vacuum conveyor for feeding a continuous line of closure caps or similar articles to an elevated discharge point substantially above the feed point.

Another object of the present invention is to provide an improved vacuum control means for a vacuum elevating conveyor.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

FIG. 1 is a side elevational view of a preferred embodiment of the vacuum elevating conveyor in accordance with the present invention.

FIG. 2 is a top plan view partially cut away of the conveyor of FIG. 1.

FIG. 3 is a sectional view of the conveyor taken along line 3—3 on FIG. 1.

FIG. 4 is an enlarged longitudinal sectional view of the conveyor of FIG. 1.

FIG. 5 is an enlarged perspective view of the vacuum control means on the vacuum box; and FIG. 6 is a sectional view of the vacuum control means taken along line 6—6 on FIG. 5.

DESCRIPTION OF THE PREFERRED EMBODIMENT

A preferred embodiment of the vacuum elevating conveyor 1 is illustrated in FIG. 1 carrying a moving line of closure caps 2 from a supply chute or hopper 3 upwardly to a removal conveyor 4. The conveyor 1 includes a belt and vacuum box assembly 5 with its lower end positioned at the cap hopper 3 and with its upper end positioned adjacent the removal conveyor 4 to transfer caps onto it. The belt and vacuum box assembly 5 is mounted at the desired feeding position on a suitable frame 6 which also supports a conveyor belt drive system 7 and a vacuum box vacuumizing assembly 8 as well as suitable controls 9 for these elements. A vacuum control means is shown at 10 on the side of the vacuum box 11 portion of the belt and vacuum box assembly 5.

The details of the preferred embodiment of the belt and vacuum box assembly 5 are illustrated in FIGS. 2, 3 and 4. The assembly is seen to comprise the elongated hollow vacuum box 11 having a belt supporting cover 12 and a relatively flat bottom 13 adapted to support the return run 14 of the conveyor belt 15. The cover 12 and bottom 13 are connected by airtight side plates 16 and end plates 17 and suitable brackets 18 are attached to the side plates 16 to mount the conveyor belt 15 end pulleys 19 on pulley shafts 20. The bearings 21 for upper end pulley 20 are seen (FIG. 1) to have adjusting slots 22 for the mounting bolts 23 and threaded adjusting screw 24 to permit adjustment of the conveyor belt 15 tension.

In order to provide for the application of air pressure against the caps 2 on the cap lifting or outer run of the conveyor belt 15, the belt 15 is made air permeable. The preferred means for this is the provision of a series of small apertures 25 extending completely around the belt 15 adjacent to the longitudinal center line of the belt 15 as best illustrated in FIGS. 2 and 4. The cover 12 of the vacuum box 11 also has an opening 26 so that they may communicate with the partial vacuum being drawn within the vacuum box 11 by the vacuumizing means 8. The preferred form of this opening is an elongated slot having a width slightly greater than the diameter of the conveyor belt apertures 25 and extending from the lower end of the vacuum box 11 to the upper end. This opening 26 is provided, as best seen in FIG. 3, by forming the vacuum box cover 12 in two channel portions 27 where each portion has an outer flange 28 attached to the vacuum box sides 16 so that opposed inner flanges 29 cooperate to define the above described slot or opening 26. A series of reinforcing members 30 are preferably provided for the box 11 as illustrated in FIG. 3. The return run 14 of the belt 15 is supported on the inner surface of the vacuum box bottom 13 with suitable inlet and outlet slots 31 being provided in the vacuum box ends 17 to permit passage of the belt 15 with a minimum entry of air into the vacuum box 11 at these slots 31. A series of cross-frames 32 are attached to the vacuum box cover 12 as illustrated in FIGS. 1 and 3 to support a pair of article guiding side rails 33 and an article guiding top rail 34. These rails 33 and 34 preferably extend beyond the upper end of the conveyor 1 over the initial portion of the removable conveyor 4 to guide the caps 2 onto the removal conveyor 4 under the force of the newly arriving caps 2 at this location as illustrated at the top of FIG. 1.

The conveyor drive 7 comprises an electric drive motor 35 mounted on the frame 6 and coupled by suitable gearing 36 to a right angle speed reduction device 37. The speed reduction device 37 drives the lower conveyor pulley 19 through the intermediation of sprockets 38 and 39 and a drive chain 40. In order to form the partial vacuum within the elongated vacuum box 11, a vacuum outlet 41 at the side of the box 11 is coupled by an air exhaust duct 42 to an air blower 43 which draws air from the vacuum box 11 through the air exhaust duct 42.

In order to maintain a substantially uniform vacuum force on the caps 2 being moved upwardly by the conveyor belt 15, an automatic vacuum control device is provided on the vacuum box 11 as illustrated at 10 in FIG. 1 and as shown in greater detail in FIGS. 5 and 6. This vacuum control device 10 comprises a vacuum control port 44 in the box side 16 and a control plate 45 pivotally mounted at 46 for opening and closing the port 44. The free end of the control plate 45 is urged towards its closed position by a spring 47 coupled at one end to the plate 45 and its other end to a bracket 48 on the vacuum box 11. The spring 47 is connected to the bracket 48 by an adjusting screw 49 to permit the spring tension to be adjusted for vacuum control. The spring force is set to permit the vacuum plate 45 to open more widely as additional apertures 25 on the belt 15 are closed by moving caps 2 and in this way to keep a fairly constant air flow through the air exhaust duct 42 and thus a substantially constant vacuum force on the caps 2 transported. This vacuum control device improves the initial loading operation as the first caps move onto the belt by assuring a sufficient vacuum force to pick up the initial caps. It also improves the subsequent operation of the belt as it becomes substantially completely filled with caps during the course of the cap lifting operation by preventing an excessive build-up of vacuum force at uncovered holes which might act so as to scratch or otherwise mar the caps or other articles.

The caps 2 may pass over or out of the top end of the conveyor belt 15 as seen in FIG. 1 or they may be guided from the side of the conveyor belt 15 through guide rails 50 as seen in FIG. 2.

It will be seen that an improved vacuum elevating conveyor has been provided for items such as metal or plastic closure caps or other articles. The conveyor is capable of feeding a continuous stream of such articles between points of differing elevations along a relatively steep path of sixty degrees or more. It is also seen to have a relatively simple and efficient form to assure reliable article movement by a method which minimizes any scratching or marking or other injury to the conveyed articles.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A vacuum elevator conveyor for continuously moving differing numbers of cup-like articles in a line from a supply position to a discharge position at a different elevation comprising the combination of:

an elongated vacuum box including an air outlet port;
   conveyor belt mounting pulleys positioned at opposite far ends of said box;
   an elongated endless conveyor belt mounted on said pulleys and having an article transporting run engaging an elongated upper surface of said box;
   an air permeable zone of spaced perforations extending longitudinally and completely around said belt;
   an elongated longitudinally directed air entry slot positioned in said elongated upper surface of said box and communicating with said air permeable zone on said belt;
   means for driving said conveyor;
   means coupled to said air outlet port for evacuating air from said box thereby drawing air into the box through said air permeable zone on said belt and said air entry slot;
   support means for said box positioning it with one of said pulleys at said supply position and the other of said pulleys positioned at said discharge position and with said one belt run thereby being inclined from the horizontal;
   automatic control valve means on said box for adjusting the volume of air drawn into said box for controlling the air flow through said air permeable zone in accordance with the number of said articles on said article transporting run;
   guide rails extending along opposite edges of the article transporting run portion of said belt for guiding said articles laterally of said belt;
   a top rail extending above at least an initial portion of said article transporting run for aligning said cup-like articles with their openings parallel to the article transporting run of said belt; and
   guide means adjacent the pulley at said discharge position and beyond said air entry slot for directing articles off of said belt.

* * * * *